(12) United States Patent
Cisler et al.

(10) Patent No.: US 7,809,688 B2
(45) Date of Patent: *Oct. 5, 2010

(54) MANAGING BACKUP OF CONTENT

(75) Inventors: Pavel Cisler, Los Gatos, CA (US); Steve Ko, San Francisco, CA (US); Kevin Tiene, Cupertino, CA (US); Mike Matas, Palo Alto, CA (US); Gregory N. Christie, San Jose, CA (US); Gene Zyrl Ragan, Santa Clara, CA (US); Robert Ulrich, San Jose, CA (US); Scott Forstall, Mountain View, CA (US); Marcel Mwa van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 11/499,839

(22) Filed: Aug. 4, 2006

(65) Prior Publication Data
US 2008/0034018 A1 Feb. 7, 2008

(51) Int. Cl.
*G06F 17/30* (2006.01)
(52) U.S. Cl. .................. 707/654; 715/229
(58) Field of Classification Search .............. 707/100, 707/654; 715/700, 229
See application file for complete search history.

(56) References Cited
U.S. PATENT DOCUMENTS

| | | |
|---|---|---|
| 5,150,473 A | 9/1992 | Zulch |
| 5,163,148 A | 11/1992 | Walls |
| 5,276,867 A | 1/1994 | Kenley et al. |
| 5,680,562 A | 10/1997 | Conrad et al. |
| 5,745,669 A | 4/1998 | Hugard et al. |
| 5,758,359 A | 5/1998 | Saxon |
| 5,790,120 A | 8/1998 | Lozares et al. |

(Continued)

FOREIGN PATENT DOCUMENTS

EP 0629950 12/1994

(Continued)

OTHER PUBLICATIONS

"Apple Previews Mac OS X Leopard," Aug. 7, 2006 [online] [retrieved on Nov. 26, 2007] Retrieved from the Internet:<URL:http://www.apple.com/pr/library/2006/aug/07leopard.html>, pp. 1-2.

(Continued)

*Primary Examiner*—James Trujillo
*Assistant Examiner*—Amresh Singh
(74) *Attorney, Agent, or Firm*—Fish & Richardson P.C.

(57) ABSTRACT

Systems and methods for generating incremental backups are provided. In one implementation a method is provided. The method includes receiving, while a current view is displayed in a user interface, a first user input requesting that a history view associated with the current view be displayed. The history view is displayed in response to the first user input, the history view including at least a first visual representation of an earlier version of the current view, the earlier version including a first element. A second user input is received while the history view is displayed. The second user input requests that the current view be modified according to the earlier version, at least with regard to the first element.

24 Claims, 9 Drawing Sheets

U.S. PATENT DOCUMENTS

| | | |
|---|---|---|
| 5,818,936 A | 10/1998 | Mashayekhi |
| 5,819,292 A | 10/1998 | Hitz et al. |
| 5,831,617 A | 11/1998 | Bhukhanwala |
| 5,832,526 A | 11/1998 | Schuyler |
| 5,961,605 A | 10/1999 | Deng et al. |
| 5,987,566 A | 11/1999 | Vishlitzky et al. |
| 6,023,506 A | 2/2000 | Ote et al. |
| 6,097,313 A | 8/2000 | Takahashi et al. |
| 6,167,532 A | 12/2000 | Wisecup |
| 6,188,405 B1 | 2/2001 | Czerwinski et al. |
| 6,366,988 B1 | 4/2002 | Skiba et al. |
| 6,396,500 B1 | 5/2002 | Qureshi et al. |
| 6,397,308 B1 | 5/2002 | Ofek et al. |
| 6,424,626 B1 | 7/2002 | Kidambi et al. |
| 6,460,055 B1 | 10/2002 | Midgley et al. |
| 6,625,704 B2 | 9/2003 | Winokur |
| 6,629,129 B1 | 9/2003 | Bookspan et al. |
| 6,711,572 B2 | 3/2004 | Zakharov et al. |
| 6,714,201 B1 | 3/2004 | Grinstein et al. |
| 6,785,786 B1 | 8/2004 | Gold et al. |
| 6,857,001 B2 | 2/2005 | Hitz et al. |
| 6,892,211 B2 | 5/2005 | Hitz et al. |
| 6,901,493 B1 | 5/2005 | Maffezzoni |
| 6,918,124 B1 | 7/2005 | Novik et al. |
| 6,948,039 B2 | 9/2005 | Biessener et al. |
| 6,959,368 B1 | 10/2005 | St. Pierre et al. |
| 7,072,916 B1 | 7/2006 | Lewis et al. |
| 7,103,740 B1 | 9/2006 | Colgrove et al. |
| 7,111,136 B2 | 9/2006 | Yamagami |
| 7,155,486 B2 | 12/2006 | Aoshima et al. |
| 7,174,352 B2 | 2/2007 | Kleiman et al. |
| 7,185,028 B2 | 2/2007 | Lechner |
| 7,200,617 B2 | 4/2007 | Kibuse |
| 7,222,194 B2 | 5/2007 | Kano et al. |
| 7,318,134 B1 | 1/2008 | Oliveira et al. |
| 7,418,619 B1 | 8/2008 | Uhlmann et al. |
| 7,518,611 B2 | 4/2009 | Boyd et al. |
| 7,630,021 B2 | 12/2009 | Matsuzaka et al. |
| 7,669,141 B1 | 2/2010 | Pegg |
| 7,676,689 B1 | 3/2010 | Shioyama et al. |
| 2002/0023198 A1 | 2/2002 | Kokubun et al. |
| 2002/0054158 A1 | 5/2002 | Asami |
| 2002/0063737 A1 | 5/2002 | Feig et al. |
| 2002/0160760 A1 | 10/2002 | Aoyama |
| 2002/0174283 A1 | 11/2002 | Lin |
| 2003/0063128 A1 | 4/2003 | Salmimaa et al. |
| 2003/0126247 A1 | 7/2003 | Strasser et al. |
| 2003/0131007 A1* | 7/2003 | Schirmer et al. ............ 707/100 |
| 2003/0135650 A1 | 7/2003 | Kano et al. |
| 2003/0137540 A1 | 7/2003 | Klevenz et al. |
| 2003/0172937 A1 | 9/2003 | Faries et al. |
| 2003/0220949 A1* | 11/2003 | Witt et al. .................. 707/204 |
| 2004/0073560 A1 | 4/2004 | Edwards |
| 2004/0078641 A1 | 4/2004 | Fleischmann |
| 2004/0088331 A1 | 5/2004 | Therrien et al. |
| 2004/0133575 A1 | 7/2004 | Farmer et al. |
| 2004/0139396 A1* | 7/2004 | Gelernter et al. ........... 715/515 |
| 2004/0167942 A1 | 8/2004 | Oshinsky et al. |
| 2004/0193953 A1 | 9/2004 | Callahan et al. |
| 2004/0210608 A1 | 10/2004 | Lee et al. |
| 2004/0220980 A1 | 11/2004 | Forster |
| 2004/0235523 A1 | 11/2004 | Schrire et al. |
| 2004/0236769 A1 | 11/2004 | Smith et al. |
| 2004/0236916 A1 | 11/2004 | Berkowitz et al. |
| 2005/0071390 A1 | 3/2005 | Midgley et al. |
| 2005/0091596 A1 | 4/2005 | Anthony et al. |
| 2005/0102695 A1 | 5/2005 | Musser |
| 2005/0144135 A1 | 6/2005 | Juarez et al. |
| 2005/0149577 A1 | 7/2005 | Okada et al. |
| 2005/0165867 A1 | 7/2005 | Barton et al. |
| 2005/0187992 A1 | 8/2005 | Prahlad et al. |
| 2005/0204186 A1 | 9/2005 | Rothman et al. |
| 2005/0216527 A1 | 9/2005 | Erlingsson |
| 2005/0246398 A1 | 11/2005 | Barzilai et al. |
| 2005/0262168 A1 | 11/2005 | Helliker et al. |
| 2005/0262377 A1 | 11/2005 | Sim-Tang |
| 2006/0026218 A1 | 2/2006 | Urmston |
| 2006/0053332 A1 | 3/2006 | Uhlmann |
| 2006/0064444 A1 | 3/2006 | Van Ingen et al. |
| 2006/0085792 A1 | 4/2006 | Traut |
| 2006/0085817 A1 | 4/2006 | Kim et al. |
| 2006/0101384 A1* | 5/2006 | Sim-Tang et al. ........... 717/104 |
| 2006/0106893 A1 | 5/2006 | Daniels et al. |
| 2006/0117309 A1 | 6/2006 | Singhal et al. |
| 2006/0137010 A1 | 6/2006 | Kramer et al. |
| 2006/0143250 A1 | 6/2006 | Peterson et al. |
| 2006/0161861 A1 | 7/2006 | Holecek et al. |
| 2006/0218363 A1 | 9/2006 | Palapudi |
| 2006/0248294 A1 | 11/2006 | Nedved et al. |
| 2007/0027935 A1 | 2/2007 | Haselton et al. |
| 2007/0030528 A1 | 2/2007 | Quaeler et al. |
| 2007/0078910 A1 | 4/2007 | Bopardikar |
| 2007/0088702 A1 | 4/2007 | Fridella et al. |
| 2007/0094312 A1 | 4/2007 | Sim-Tang |
| 2007/0136389 A1 | 6/2007 | Bergant et al. |
| 2007/0156772 A1 | 7/2007 | Lechner |
| 2007/0168497 A1 | 7/2007 | Locker et al. |
| 2007/0185922 A1 | 8/2007 | Kapoor et al. |
| 2007/0192386 A1 | 8/2007 | Fries et al. |
| 2007/0266007 A1 | 11/2007 | Arrouye et al. |
| 2007/0271303 A1 | 11/2007 | Menendez et al. |
| 2007/0288536 A1 | 12/2007 | Sen et al. |
| 2008/0016576 A1 | 1/2008 | Ueda et al. |
| 2008/0022393 A1 | 1/2008 | Waltermann et al. |
| 2008/0028007 A1 | 1/2008 | Ishii et al. |
| 2008/0033922 A1 | 2/2008 | Cisler et al. |
| 2008/0034004 A1 | 2/2008 | Cisler et al. |
| 2008/0034011 A1 | 2/2008 | Cisler et al. |
| 2008/0034013 A1 | 2/2008 | Cisler et al. |
| 2008/0034017 A1 | 2/2008 | Giampaolo et al. |
| 2008/0034018 A1 | 2/2008 | Cisler et al. |
| 2008/0034019 A1 | 2/2008 | Cisler et al. |
| 2008/0034039 A1 | 2/2008 | Cisler et al. |
| 2008/0059894 A1 | 3/2008 | Cisler et al. |
| 2008/0077808 A1 | 3/2008 | Teicher et al. |
| 2008/0091655 A1 | 4/2008 | Gokhale et al. |
| 2008/0126441 A1 | 5/2008 | Cisler et al. |
| 2008/0126442 A1 | 5/2008 | Cisler et al. |
| 2008/0141029 A1 | 6/2008 | Culver |
| 2008/0177961 A1 | 7/2008 | McSharry et al. |
| 2008/0229037 A1 | 9/2008 | Bunte et al. |
| 2008/0285754 A1 | 11/2008 | Kezmann |
| 2010/0017855 A1 | 1/2010 | Johnson et al. |

FOREIGN PATENT DOCUMENTS

| | | |
|---|---|---|
| EP | 1152352 | 11/2001 |
| EP | 1582982 | 10/2005 |
| WO | 01/06356 | 1/2001 |
| WO | WO 02/101540 | 12/2002 |
| WO | 2008/019237 | 2/2008 |

OTHER PUBLICATIONS

"Aulaclic: Unit 6. The Recycle Bin," Nov. 2005 [online] [retrieved on Nov. 26, 2007] Retrieved from the Internet<URL:http://www.teacherclick.com/winxp/t_6_1.htm>, pp. 1-2.

Bonwick, Jeff, "ZFS The Last Word in File Systems," [online] [retrieved on Jan. 22, 2008] Retrieved from the Internet:<URL:http://opensolaris.org/os/community/zfs/docs/zfs.pdf>, 34 pages.

Bonwick et al., "The Zettabyte File System," [online] [retrieved on Jan. 22, 2008] Retrieved from the Internet:<URL:http://partneradvantage.sun.com/protected/solaris10/adoptionkit/tech/zfs/zfs_overview.pdf>, 13 pages.

Griffiths, R., "Leopard first looks: Time Machine," Aug. 8, 2006 [online] [retrieved on Nov. 23, 2007] Retrieved from the Internet:<URL:http://www.macworld.com/2006/08/firstlooks/leotimemacindex.php?pf=1> pp. 1-2.

International Search Report and Written Opinion, PCT/US2007/074729, Jul. 12, 2007, 11 pages.

International Search Report and Written Opinion, PCT/US2007/074881, Jul. 12, 2007, 11 pages.

Sun Microsystems, Inc., "ZFS On-Disk Specification," Draft: Dec. 9, 2005, [online] [retrieved on Jan. 22, 2008] Retrieved from the Internet:<URL:http://opensolaris.org/os/community/zfs/docs/ondiskformat0822.pdf,>, 55 pages.

Tittel, Ed. "An EAZ Way to Restore Crippled and Inoperable Systems." ChannelWeb. Apr. 25, 2005. http://www.crn.com/white-box/161502165.

"What's New in Word 2002." Wellesly College Information Services Computing Documentation, Jan. 2002, http://www.wellesley.edu/Computing/Office02/Word02/word02.html. Accessed 812/2008.

International Search Report and Written Opinion, PCT/US2007/074653, Aug. 14, 2008, 14 pages.

International Search Report and Written Opinion, PCT/US2008/065146, Oct. 31, 2008, 21 pages.

Academic Resource Center, http://www.academicresourcecenter.net/curriculum/glossary.aspx.

International Search Report and Written Opinion, PCT/US2008/066212, Mar. 9, 2009, 26 pages.

Bott, "Windows XP Backup Made Easy," [Online] [Retrieved on Jul. 7, 2009]; Retrieved from the Internet URL: http://www.microsoft.com/windowsxp/using/setup/learnmore/bott_03july14.mspx, 4 pages.

Engst, "Retrospect 6.0: Powerful Backup Program Adds Panther Compatibility and Enterprise Features," [Online] [Retrieved on Jul. 8, 2009]; Retrieved from the Internet URL: http://www.macworld.com/article/31038/2004/06/retrospect6x0.html, 8 pages.

Harder, "Microsoft Windows XP System Restore," [Online] [Retrieved on Jul. 7, 2009] Retrieved from the Internet URL: http://msdn.microsoft.com/en-us/library/ms997627.aspx, 8 pages.

"StorageSync: Backup, Restore, & Synchronization Software User's Guide", SimpleTech, 2003, 100 pages.

International Search Report and Written Opinion, PCT/US2007/074863 Apr. 21, 2009, 20 pages.

European Examiner Werner Ebert, Communication pursuant to Article 94(3) EPC for Application No. EP 07 799 899.5, dated May 14, 2009, 2 pages.

European Examiner Werner Ebert, Communication pursuant to Article 94(3) EPC for Application No. EP 07 799 899.5, dated Oct. 7, 2009, 4 pages.

"How to Interpret Windows Installer Logs," [Online] [Retrieved on Dec. 12, 2009] Retrieved from the Internet URL: http://blogs.technet.com/richard_macdonald/archive/2007/04/02/How-to-Interpret-Windows-Installer-Logs.aspx; published Apr. 4, 2007; 6 pages.

* cited by examiner

MANAGING BACKUP OF CONTENT

RELATED APPLICATIONS

This application is generally related to the following jointly owned and co-pending patent applications, each incorporated herein by reference in its entirety:

U.S. patent application Ser. No. 11/499,250, for "Application-Based Backup-Restore of Electronic Information," filed Aug. 4, 2006;

U.S. patent application Ser. No. 11/499,881, for "User Interface for Backup Management," filed Aug. 4, 2006;

U.S. patent application Ser. No. 11/499,879, for "Navigation of Electronic Backups," filed Aug. 4, 2006;

U.S. patent application Ser. No. 11/499,880, for "Architecture for Back Up and/or Recovery of Electronic Data," filed Aug. 4, 2006;

U.S. patent application Ser. No. 11/499,385, for "Searching a Backup Archive," filed Aug. 4, 2006;

U.S. patent application Ser. No. 11/499,885, for "Conflict Resolution in Recovery of Electronic Data," filed Aug. 4, 2006;

U.S. patent application Ser. No. 11/499,840, for "System for Multi-Device Electronic Backup," filed Aug. 4, 2006;

U.S. patent application Ser. No. 11/499,848, for "System for Electronic Backup," filed Aug. 4, 2006;

U.S. patent application Ser. No. 11/499,867, for "Restoring Electronic Information," filed Aug. 4, 2006;

U.S. patent application Ser. No. 11/499,386, for "Links to a Common Item in a Data Structure," filed Aug. 4, 2006;

U.S. patent application Ser. No. 11/499,866, for "Event Notification Management," filed Aug. 4, 2006;

U.S. patent application Ser. No. 11/499,256, for "Consistent Backup of Electronic Information," filed Aug. 4, 2006.

TECHNICAL FIELD

The disclosed implementations relate generally to storing and restoring data.

BACKGROUND

A hallmark of modern graphical user interfaces is that they allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

With the sophisticated tools available, users are encouraged not only to create and save a multitude of items in their computers, but to revise or otherwise improve on them over time. For example, a user can work with a certain file and thereafter save its current version on a storage device. The next day, however, the user could have had second thoughts about the revisions, or could have come up with new ideas, and therefore opens the file again.

The revision process is usually straightforward if the user wants to add more material to the file or make changes to what is there. But it is typically more difficult for a user who has changed his/her mind about changes that were previously made and wants the file back as it was once before. Application programs for word processing typically let the user "undo" previous edits of a text, at least up to a predefined number of past revisions. The undo feature also usually is configured so that the previously made revisions must be undone in reverse chronological order; that is, the user must first undo the most recently made edit, then the second-most recent one, and so on. If the user saves and closes the document and thereafter opens it again, it may not be possible to automatically undo any previous edits.

SUMMARY

Systems and methods for generating incremental backups for a system (i.e., a computer). A user interface can allow a user to view and navigate the generated backups. A user can invoke the user interface from an application, folder, or using other means. Data from the backups can be selected and restored to the current state. Archive management functions provide for management of stored backup data. Additionally, backup operations can be performed as continuous opportunistic backup operations that can minimize data loss between scheduled backup operations.

In general, in one aspect, a method relating to modifying a view in a user interface is provided. The method includes receiving, while a current view is displayed in a user interface, a first user input requesting that a history view associated with the current view be displayed. The history view is displayed in response to the first user input, the history view including at least a first visual representation of an earlier version of the current view, the earlier version including a first element. A second user input is received while the history view is displayed. The second user input requests that the current view be modified according to the earlier version, at least with regard to the first element.

Implementations of the method can include one or more of the following features. The second user input does not request that the modification be limited to the first element, and the modification restores the current view to the earlier version. The second user input can request that the modification be limited to the first element, and wherein the modification modifies the current view to include the first element and does not otherwise modify the current view. The first element can be one selected from the group consisting of: a folder, a file, an item, an information portion, a playlist, a directory, an image, system parameters, and combinations thereof. The first visual representation can be included in a timeline presented in the history view, the timeline including several visual representations of earlier versions of the current view.

The earlier versions of the current view can be obtained at times defined by a schedule. The earlier versions of the current view can be obtained at times defined by a rule. The earlier versions of the current view can be obtained at times when at least one predefined event occurred. The history view further can include an input control for modifying the timeline to include only at least one of the visual representations whose corresponding earlier version differs from the current view. The history view can include a rollover function providing that the timeline is displayed when a user-controlled cursor is located over the timeline, and that the timeline is not displayed when the user-controlled cursor is not located over the timeline. The history view can further include a preview area that presents at least the first element of the earlier version.

In general, in one aspect, a method is provided. The method includes defining a criterion for capturing a state of a view of a user interface. The state of the view is captured in accordance with the criterion. A prompt is received to suspend presentation of a current view and present a captured view. The captured view is reinstated into the current view of the user interface.

In general, in one aspect, a method is provided. The method includes evaluating a current view of a user interface. A determination is made that an undesirable change to the current view of the user interface has occurred relative to a past view of the user interface. The current view of the user interface is suspended. One or more past views of the user interface are presented. The past view of the user interface is reinstated into the current view.

In general, in one aspect, a method is provided. The method includes defining criteria for capturing a state of a view of a user interface. One or more temporary states of the view are captured prior to the criteria being satisfied. The state of the view is captured in accordance with the criteria.

Implementations of the method can include one or more of the following features. The method can further include receiving a prompt to suspend presentation of a current view and present a captured view and reinstating the captured view into the current view of the user interface. The method can further include discarding the temporary states of the view after capturing the sate of the view. The criteria can be a time period and where capturing a temporary state of the view occurs when a change in the state of the view is identified.

In general, in one aspect, a method is provided. The method includes storing a plurality of history views in an archive. Criteria are determined for deleting one or more of the plurality of history views. One or more of the plurality of history views are deleted in accordance with the criteria.

Implementations of the method can include one or more of the following features. The criteria can include a time period for retaining stored history views in the archive and a history view is deleted when the age of the history view exceeds the time period. The criteria can include an amount of storage space remaining in the archive and a history view is deleted when the amount of storage space falls below a threshold level. The criteria can include one or more pruning rules and one or more history views are deleted according to the pruning rules.

Particular embodiments of the subject matter described in this specification can be implemented to realize one or more of the following advantages. Backup data can be stored, allowing a user to retrieve past states of applications or data. The user can easily navigate a set of historical views presented to the user. The user can also easily navigate within each historical view as a hierarchical file structure. The user can restore lost data or a prior version of data after identifying the particular data in a user interface. Lost data can be minimized by frequently performing temporary backups between schedule backup operations.

The details of the various aspects of the subject matter described in this specification are set forth in the accompanying drawings and the description below. Other features, aspects, and advantages of the invention will become apparent from the description, the drawings, and the claims.

DETAILED DESCRIPTION

Figure 1:
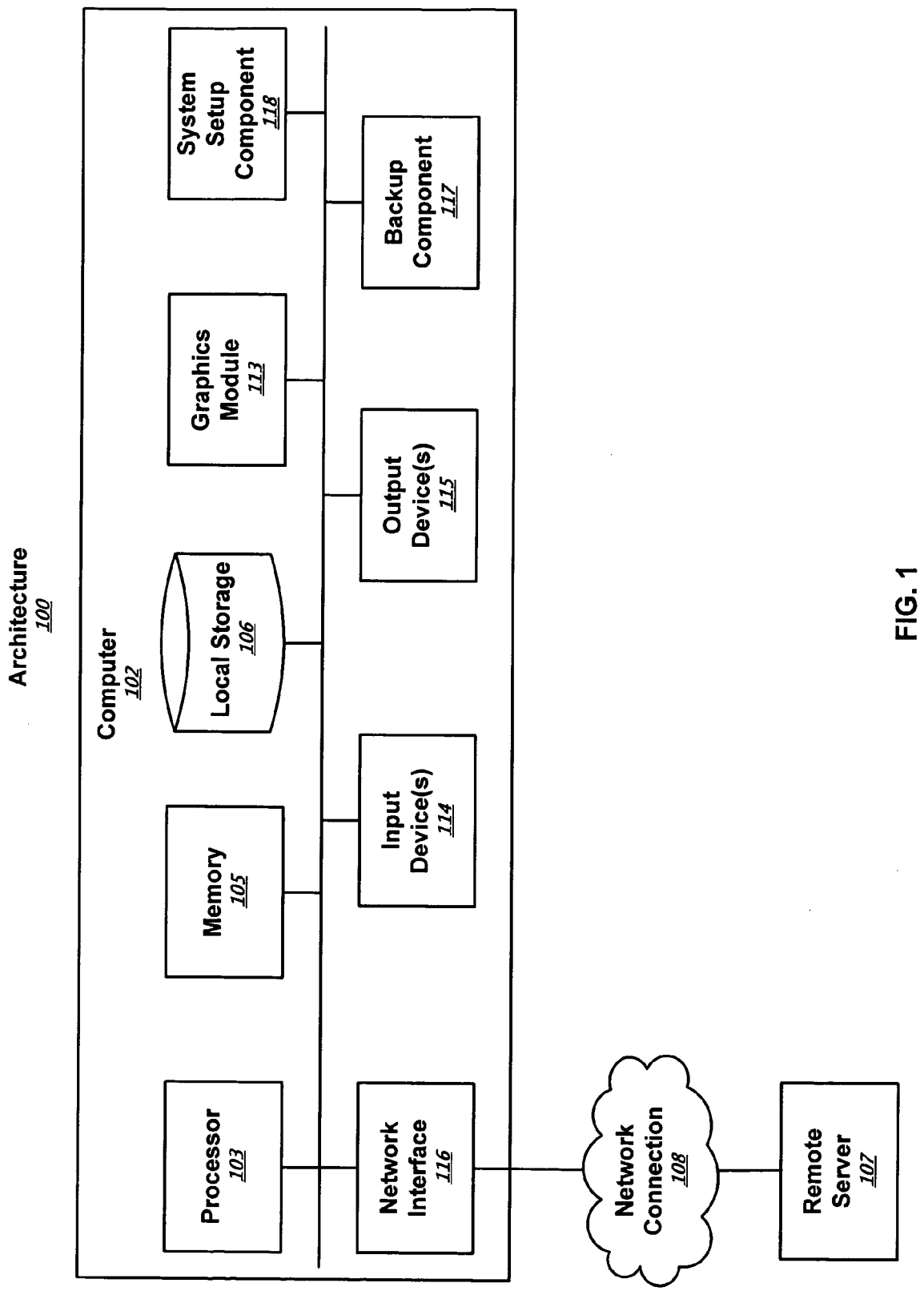
FIG. 1 is a block diagram of an example of an architecture for modifying a user interface view in a display environment.

FIG. 1 is a block diagram of an architecture 100 for capturing at least one earlier version of a user interface view and allowing a user to initiate a restoration based on it. As used herein, a view refers to an item, element, or other content, capable of being stored and/or retrieved in an interface, that can be subjected to a backup operation by a backup component 117. For example, a user interface view can contain any number of icons, files, folders, application state information and/or machine state information, preferences, etc. The architecture 100 includes a personal computer 102 communicatively coupled to a remote server 107 via a network interface 116 and a network 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user interacts with the architecture 100 via the input and output devices 114, 115.

The computer 102 also includes a local storage device 106 and a graphics module 113 (e.g., graphics card) for storing information and generating graphical objects, respectively. The local storage device 106 can be a computer-readable medium. The term "computer-readable medium" refers to any medium that includes data and/or participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

While modifications of a user interface view are described herein with respect to a personal computer 102, it should be apparent that the disclosed implementations can be incorporated in, or integrated with, any electronic device that has a user interface, including without limitation, portable and desktop computers, servers, electronics, media players, game devices, mobile phones, email devices, personal digital assistants (PDAs), embedded devices, televisions, other consumer electronic devices, etc.

Systems and methods are provided for searching stored contents that correspond to earlier versions of system information, application information or system, application, or user interface state. The systems and methods can be standalone or otherwise integrated into a more comprehensive application. In the materials presented below, integrated systems and methods are provided for viewing and modifying an interface view (e.g., a user interface view) are disclosed.

Though discussion is made with reference to modifying a user interface view, those of ordinary skill will recognize that such a view can be based on various data structures, files, processes, and other aspects of information management. It follows that modification to file structures, data and the like is also contemplated in order to achieve the modification to the user interface view. In other words, while the restoration of the user interface view from one state to another can be the most apparent change from the user's perspective, this is accomplished through the corresponding changes in the underlying system content.

One of ordinary skill in the art will recognize that the engines, methods, processes and the like that are described can themselves be an individual process or application, part of an operating system, a plug-in, an application, or the like.

In one implementation, the system and methods can be implemented as one or more plug-ins that are installed and run on the personal computer 102. The plug-ins are configured to interact with an operating system (e.g., MAC OS® X, WINDOWS XP, LINUX, etc.) and to perform the various functions, as described with respect to the Figures. A system and method for modifying a user interface view can also be implemented as one or more software applications running on the computer 102. Such a system and method can be characterized as a framework or model that can be implemented on various platforms and/or networks (e.g., client/server networks, wireless networks, stand-alone computers, portable electronic devices, mobile phones, etc.), and/or embedded or bundled with one or more software applications (e.g., email, media player, browser, etc.).

The computer 102 includes the backup component 117 that allows for the storage of versions of the computer's files or other items (e.g., restoring a view including past state of a file, application, application data, parameters, settings, and the like), for example within the local storage 106 or in an external storage repository. In one implementation, the backup component 117 also allows a user to select any of the stored versions and use it to initiate a restoration of that version in the computer.

The computer 102 also includes a system setup component 118 for setting up a computer system. In one implementation, the component 118 is configured for use in setting up the computer 102. The setup component 118 can then use archival data captured in another system for such setup, the data having been captured in the other system using a backup engine corresponding to the backup component 117. In another implementation, the component 118 is configured for use in transferring some or all contents of the computer 102 to another system that is being set up. The setup component can then use archival data stored by the backup component 117. Particularly, the system setup component 118 can use the archival data to fully restore the computer system's key data files after a catastrophic event which caused the loss or corruption of data within the local storage device 106. For example, if a malicious software attack, such as a virus, corrupted key system data, the system setup component 118 could restore archived data using a version with a timestamp previous to the event of the attack.

In another implementation, the system setup component 118 can be used to migrate a user's data from one computer system to the next. For example, if the user purchased a new computer, the system setup component could be used to copy all important data from one machine to the other by restoring a recent archive. First, data archives can be created of the information stored by computer 102 using the backup component 117. The data archives could be placed on an external storage device connected to computer 102, to name one example. Next, the user would connect the external storage device to the new computer system and run the system setup component 118 from within the new computer to migrate all of the data from computer 102 to this new computer system. As another example, the system setup component 118 located on the computer 102 can remotely setup the new computer system using the archived contents from the backup component 117.

Figure 2:
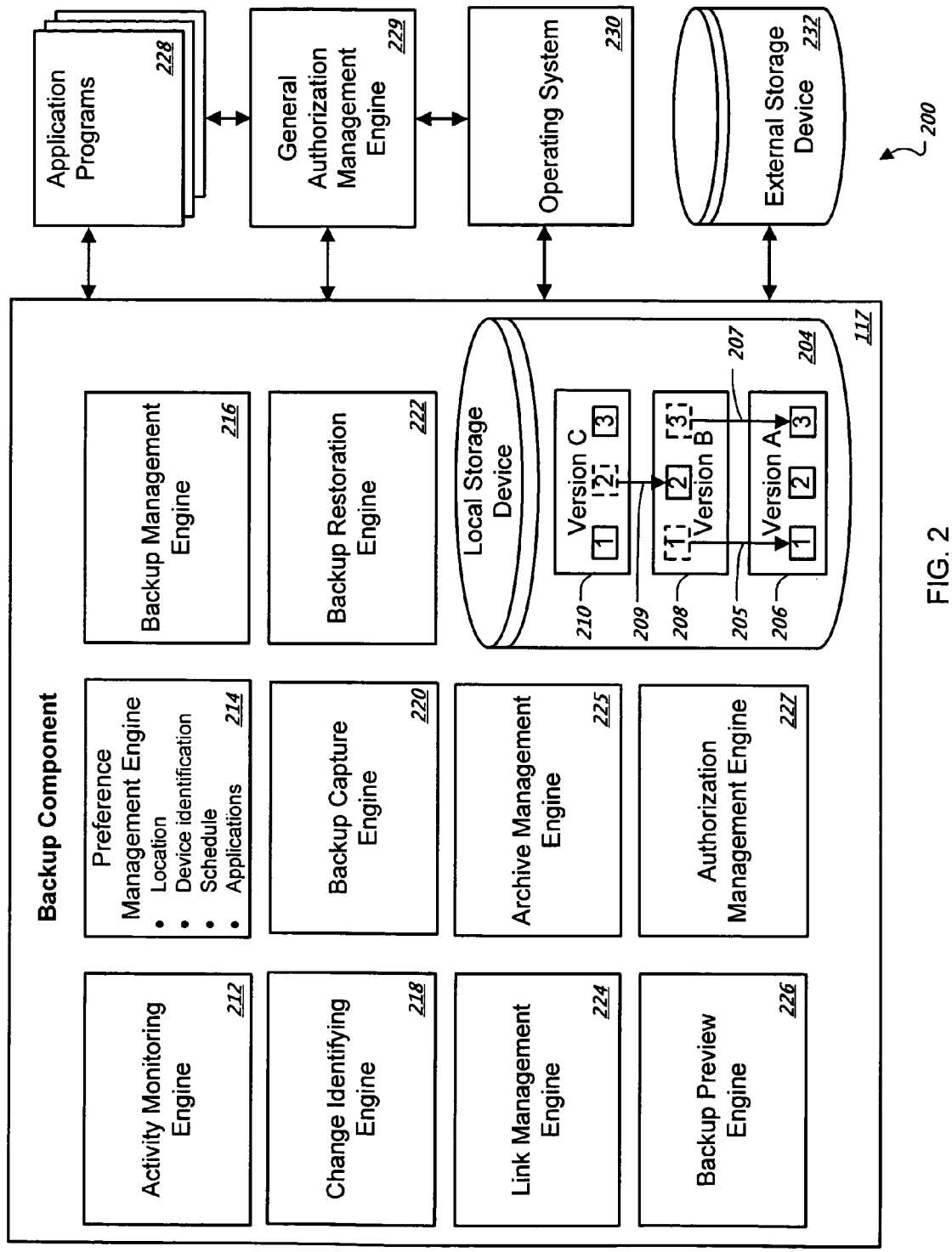
FIG. 2 is a block diagram of an example of an architecture for backing up and restoring application files.

FIG. 2 is a block diagram of an exemplary architecture 200 for enabling the back up and restoration of data (e.g., application files, application data, settings, parameters or the like), such as those associated with a set of application programs 228. Backup component 117 provides back up and restoration capability for the system. Many different items or elements can be the subject of a backup operation in the system. For example, folders, files, items, information portions, directories, images, system parameters, playlists, address books, e-mails, e-mail folders, a state of an application or state of the system, preferences (e.g., user or system preferences), and the like all can be candidates for archiving. Other types are also possible. In this example, the backup component 117 includes a local storage device 204 and an external storage device 232. Versions can be stored on either of them. Any number of local and/or external storage devices can be used by the backup component 117 for storing versions. In this implementation, the backup component 117 views any and all storage device(s) designated for version storage as a single memory bank.

In one implementation, the backup component 117 runs as a background task on an operating system 230 that is not visible to the user. The backup component 117 can be capable of running across multiple user accounts.

The backup component 117 includes an activity monitoring engine 212. In one implementation, the activity monitoring engine 212 monitors for changes within an application view (e.g. files) that are targeted for a backup operation. A change can also include the addition of new files or data or the deletion of the same. In one implementation, the activity monitoring engine 212 is capable of discerning between a substantive change (e.g. the text within a document has been modified) and a non-substantive change (e.g. the play count within an iTunes playlist has been updated, or several changes cancel each other out) through its interaction with the application programs 228. The activity monitoring engine 212 can, for example, create a list of modified elements to be used when a backup event is eventually triggered. In one implementation, the activity monitoring engine 212 can monitor the system for periods of inactivity. The activity monitoring engine 212 can then trigger a backup event during a period of time in which the backup operations will not cause a system slowdown for an active user.

A preference management engine 214 specifies some operating parameters of the backup component 117. In one implementation, preference management engine 214 contains user-specified and/or system default application parameters for the backup component 117. These can include settings for the details of capturing and storing the earlier versions. For example, the preference management engine 214 can determine the frequency of the backup capture, the storage location for the backup versions, the types of files, data, or other items that are eligible for backup capture, and the events which trigger a backup capture (periodic or event-driven, etc.). In one implementation, the triggering events can be programmatically defined. In another implementation, the triggering event results in a backup capture of only a portion of the changed content.

In one implementation, the preference management engine 214 can detect that a new storage device is being added to the system and prompt the user whether it should be included as a backup repository. Files and other items can be scheduled for backup due to location (e.g. everything on the a particular drive, for example, a lettered drive such as everything within a C: drive and within D:/photos, or a named drive or location such as "MyBigDisk" or within "/ExtraStorage/Photos", thus reference in this specification to drives is not limited to lettered drives or paths), a correlation with specific applications (e.g. all pictures, music, e-mail, address book and system settings), or a combination of strategies. Different types of items can be scheduled to be stored on different devices or on different segments of a storage device during a backup operation. In one implementation, the backup component 117 stores the versions in a format corresponding to a file system structure.

A backup management engine 216 coordinates the collection, storage, and retrieval of view versions performed by the backup component 117. For example, the backup management engine 216 can trigger the activity monitoring engine 212 to watch for activities that satisfy a requirement specified in the preference management engine 214.

In one implementation, a change identifying engine 218 locates specific views or other items within to determine if they have changed. The change identifying engine 218 may be capable of discerning a substantive change from a non-substantive change, similar to the example described above for the activity monitoring engine 212. In one implementation, the change identifying engine 218 traverses a target set of files, data, or other items, comparing a previous version to the current version to determine whether or not a modification has occurred.

A backup capture engine 220 can locate files, data, or other items that are to be backed up. The backup capture engine 220 could invoke the activity monitoring engine 212 and/or the change identifying engine 218, for example, to generate a capture list. The backup capture engine 220 can then store copies of these elements in one or more targeted storage repositories. The backup capture engine 220 can track multiple version copies of each item included in the backup repository.

The backup component 117 includes a backup restoration engine 222 to restore previous views (e.g. versions of files, data, or other items). In one implementation, the backup restoration engine 222 provides a user interface (e.g., a graphical user interface) where a user can select the item(s) to be restored.

In one implementation, the backup component 117 manages multiple versions of an item using links. In such an implementation, the backup component 117 can include a link management engine 224 that coordinates the item links between version sets. Within the local storage device 204, in one implementation, a version A first backup archive 206 ("Version A") contains three separate archived items called 1, 2 and 3, respectively. Version A may have been captured by the backup capture engine 220 at some point in time.

After version A is captured, a file associated with item 2 can be modified, for example by a user editing a document that is included within item 2. Another capture event creates a second backup archive 208 ("Version B"). Because item 2 is no longer identical to the copy contained within Version A, a copy of the new or revised item 2 is stored within Version B. However, items 1 and 3 have not changed since Version A. The link management engine 224 creates a link 205 from Version B to item 1 of Version A. Accordingly, only one copy of item 1 is required to be stored within the local storage device 204 at the time Version B is created. Similarly, a link 207 connects item 3 of Version A to Version B.

At a later time, information associated with items 1 and 3 can be modified. When a third backup archive 210 ("Version C") is generated, the backup capture engine 220 stores the items 1 and 3. However, the information associated with item 2 remains unchanged from Version B, so the link management engine 224 creates a link 209 from Version C to the archived copy of item 2.

In one implementation, the link management engine 224 can manage links across multiple version sets. For example, if item 3 had not been modified between the captures of the version B backup archive 208 and the version C backup archive 210, then the version C backup archive 210 would contain a link to item 3 of the version A backup archive 206.

If a user changes the target storage device between backup operations, the link management engine 224, in one implementation, can perpetuate links across multiple storage devices. For example, assume that backup versions are set to be stored in the external storage device 232 rather than the local storage device 204 and that the first backup archive 206 ("Version A") therefore has been placed there. If the user then instead selects the local storage device 204 as the target repository before the next capture event, this causes the second backup archive 208 ("Version B") to be created within local storage device 204. Version B will now contain links 205 and 207 to Version A within the external storage device 232.

In some situations, the storage repository holding a linked version of an item is no longer included within, or accessible from, the system. In one implementation, the link management engine 224 can then require the backup capture engine 220 to generate new copies of an item or items. For instance, if the external storage device 232 contains the first backup archive 206 ("Version A"), and a user disconnects the external storage device 232 previous to the capture of the third backup archive 210 ("Version C"), the link management engine 224 can, upon detecting this condition, require the backup capture engine 220 to capture new copies of item 1 and item 3, even though the items have not changed between backup events.

A backup preview engine 226 is configured to provide a preview of at least one of the captured earlier versions. The preview can allow a user to peruse the contents of a backup copy of a view (e.g., a file, data, or file set) before opting to restore the element (e.g. file(s)) using the backup restoration engine 222.

The archived copies can be compressed and/or encrypted. An example of a compression technique is the ZIP file format for data compression and archiving. An example of an encryption technique is the RSA algorithm for public key encryption. Other compression techniques or encryption techniques can be used. In one implementation, the archive storage structure mimics a typical file system structure, such that the archived versions can be perused using a standard file system viewing utility.

Access to data elements within the architecture 200 or the computer system 102 can be controlled by a general authorization management engine 229. The general authorization management engine 229 stores permissions settings for individual data elements, such as a file, folder, or disk drive. Before a user gains access to a data element, the element's permissions settings would be verified by the general authorization management engine 229. In one implementation, the general authorization management engine can require a password or other authorization data (e.g. biometric data, etc.) before allowing a user access to a particular data element.

An archive management engine 225 tracks where archived views are being stored. In one implementation, the archive management engine 225 obtains user options from the preference management engine. Such settings can include, but are not limited to, methods to be used to remove older or otherwise unnecessary archived views. These settings can establish one or more criteria for archived view deletion, for instance in the event of storage capacity being reached or on a regular basis. In one implementation, the archive management engine 225 alerts the user when archives are missing because a device has gone offline. In another implementation, the archive management engine 225 can bar a user from viewing another user's archival data due to system permissions settings.

The backup component 117 can include an authorization management engine 227 that controls users' access to archived states, for example by storing permission settings for individual data elements within the data archives. In one implementation, if multiple users make use of the time machine backup component 117 on a single system, each user can choose to keep separate archives. Access to an individual user's archives can be password protected or otherwise held in a secure manner. In one implementation, the data within the user's archives contain the same read/write permissions as the original data element. In one implementation, the authorization management engine 227 inherits the data elements' permissions settings from the general authorization management engine 229 and indexes the archived contents accordingly. Using these permissions settings, the authorization management engine 227 can deny a user access to a copy of a data element when the user would not have authorization to view the original data element. In another implementation, the user may establish permissions or encryption techniques specifically for the data archives. User permissions and encryption settings could be user-selectable from within the preference management engine. The preference management engine would then transfer the settings to the authorization management engine for storage.

There will now be described some exemplary user interfaces that can be used in managing and using a system for backing up versions of views (e.g., including files, data, or other items). In one implementation, the user interfaces can be generated by an operating system and the backup component 117.

Figure 3:
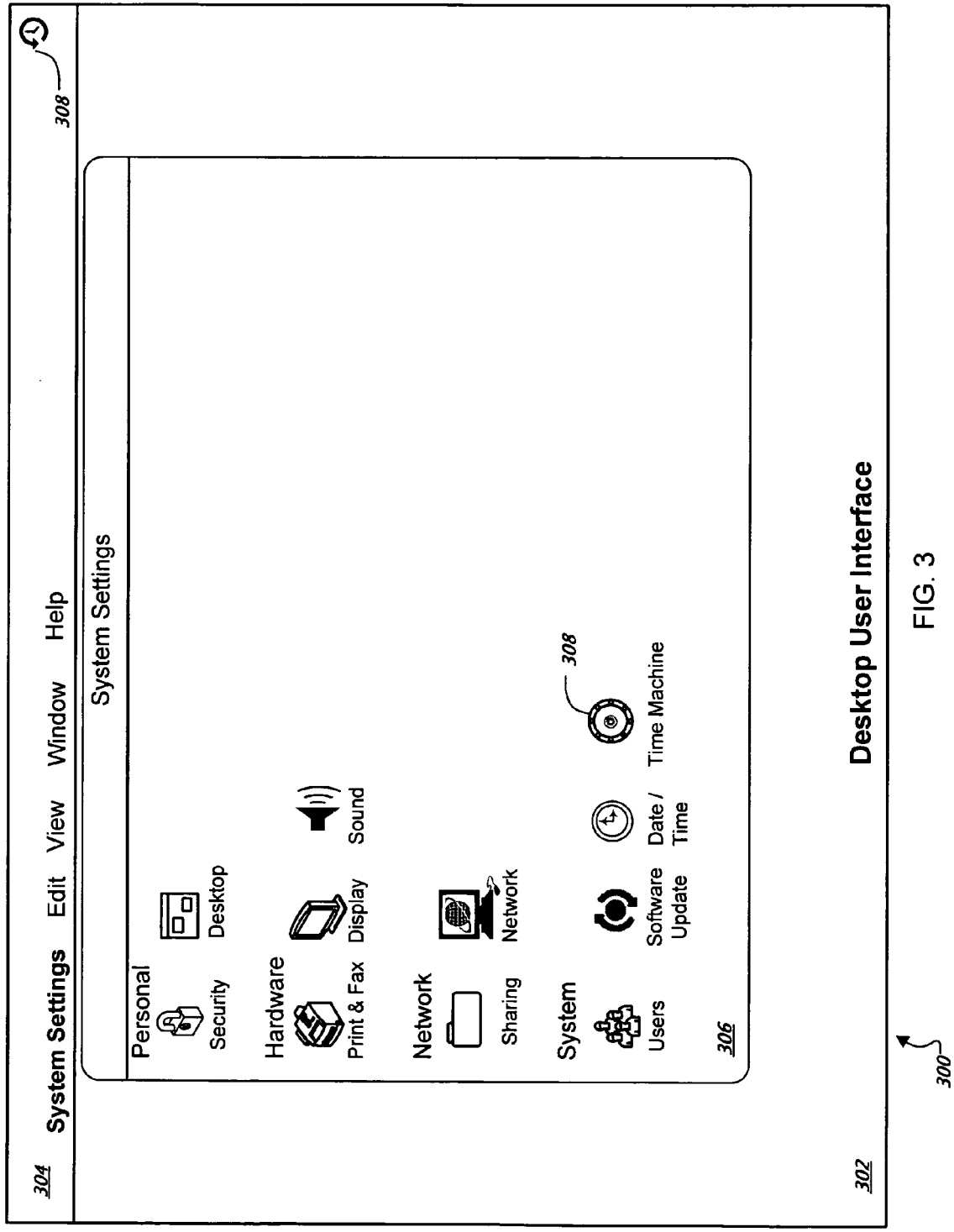
FIG. 3 shows an example of a desktop user interface for accessing the time machine settings dialog.

FIG. 3 is a screen shot 300 depicting a user interface 302 (e.g., a desktop user interface). In this example, the system where the user interface 302 is generated is provided with a component that captures and manages versions of views (including items such as files, folders, etc.). That component is here referred to as a "time machine". For example, the time machine can be part of the backup component 117.

A menu bar 304 within the user interface 302 allows access to the system settings dialog 306. A time machine icon 308 is available within the system settings dialog 306. A user can select the time machine icon 308 to open a time machine settings dialog such as the one portrayed within FIG. 4. Thus, the time machine icon 308 is here accessible in the context where the user can configure other system aspects, such as hardware peripherals, system utilities, network connectivity, etc. With reference briefly to FIG. 1, the setup component 118 could be configured so that it specifies, upon a system being set up, any or all of the settings covered by the features shown in the dialog 306. In one implementation, the time machine icon 308 also acts as a "hot key" for quick access to performing a backup operation. For example, in one implementation the user could access the time machine settings dialog by right-clicking on the time machine icon 308, or the user could left-click the time machine icon 308 to trigger a backup event. In other implementations, the time machine engine could be accessible within the user interface 302 itself, through an applications menu or file listing, or as part of the functionality included within another application, etc.

Figure 4:
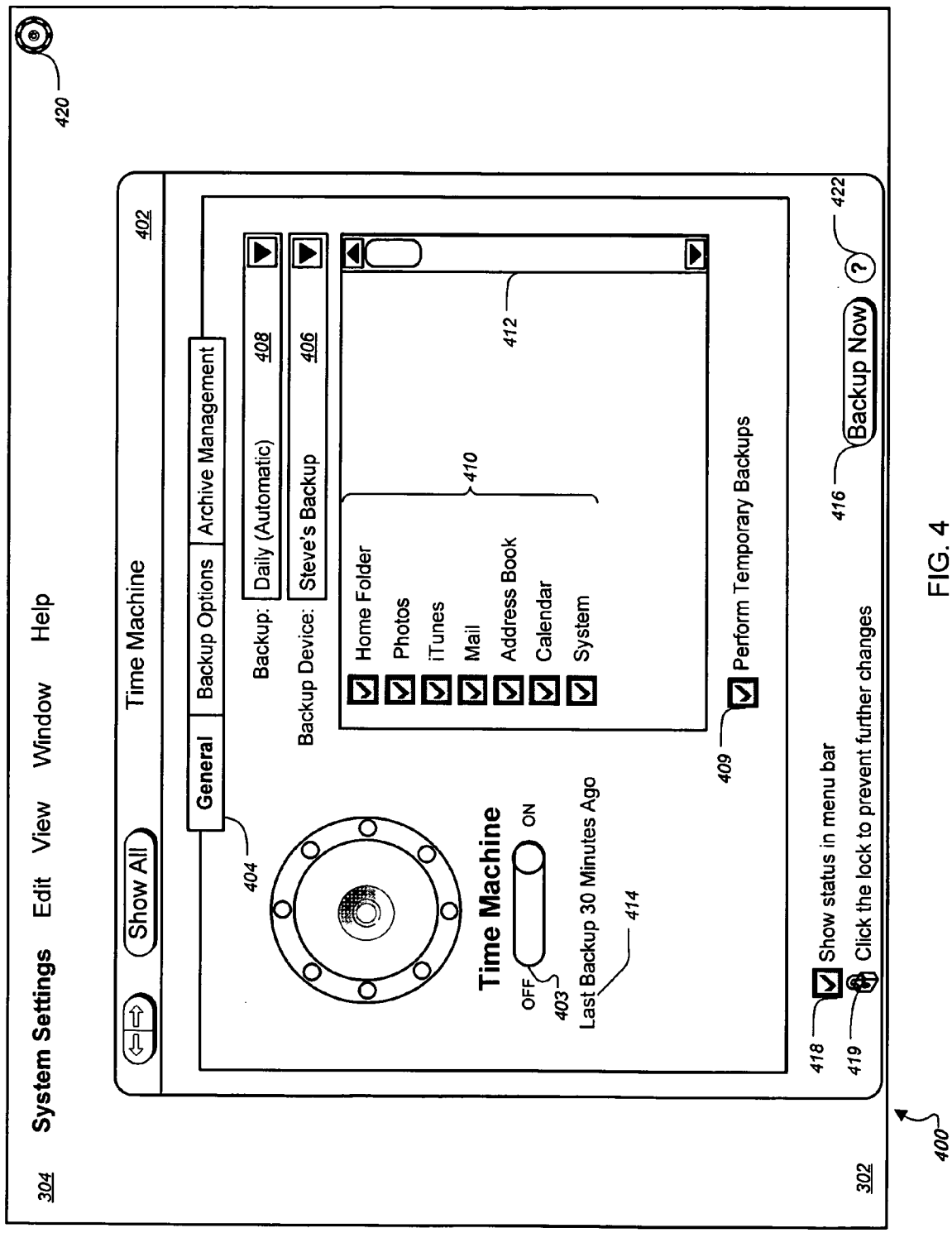
FIG. 4 shows an example of a time machine settings dialog.

FIG. 4 shows a screen shot 400 depicting an example of a time machine settings dialog 402 within the user interface 302. In one implementation, the dialog 402 is generated by the preference management engine 214 (FIG. 2). A general settings tab 404 is selected. A user can select a device name within a drop-down menu 406 to establish backup location. A drop-down menu 408 can be used to set the frequency of making backups (e.g. every day, every week, every other week, every month, etc.). In another implementation, a time of day or other granularity setting could be available. Such a setting would allow the user to request that the utility run during a typically inactive period, such as overnight. In one implementation, an event-driven trigger could be specified, such as having the backup utility run upon system start-up. In another example of an event-driven trigger, the time machine could be set to back up when there has been activity relating to the item that is to be backed up. In one implementation, the backup can be set to run in periods of inactivity when there is little or no user demand on system performance. In another implementation, a backup can be run according to programmatically defined criteria, rules, or dynamically generated criteria.

A user can select from a set of applications 410 which type(s) of data is eligible for a backup operation. The applications list could contain specific products (e.g. iTunes) and/or general categories (e.g. photos, address book, e-mail inbox). In one implementation, each application name is individually selectable. For example, within an internet browser application, the user can set the bookmarks and personal settings to be backed up but not the history or cookies. One implementation allows a user to select specific disk drives, folders, and/or files for storing backup data. A scroll bar 412 allows the user to view additional applications or candidates that do not fit within the viewing window.

A user can additionally select a checkbox 409 to enable temporary backup operations to occur between scheduled backup operations. In one implementation, the backup component 117 stores periodic backups of modified data elements such that, if a catastrophic event causes the loss of that element, recent changes are not permanently lost. For example, consider the event in which the most recent backup event took place at 1:00 a.m., and the user modified an important file at 3:00 p.m. If a file corruption occurred at 5:00 p.m., it would cause the present day's modifications to be permanently lost. However, if temporary backups were enabled, then the backup archives could include a temporary archive containing a more recent copy of the file. The system setup component 118 could use the temporary archive to restore the file. In one implementation, links are used so that only one copy of a changed data element will be retained within the temporary backup archives. When a scheduled backup archive occurs, in one implementation, the temporary backup archives can be deleted. The system may take these measures to ensure that temporary backup archives use a minimal amount of storage space. In some implementations, the temporary backup archives are not accessible (or visible) to the user, in contrast to the scheduled archives. For example, when accessing the backup archives within a file system browser type application, the backup archive files would not be available.

Temporary archives can be created at a set frequency, e.g. on an hourly basis or every other hour, for example. In one implementation, the frequency of temporary archive creation can be based on the frequency of the user's scheduled backup archiving events. In another implementation, temporary archives are created upon modification of data elements. The backup capture engine 220 could be triggered by the activity monitoring engine 212 to create a temporary backup during a time of system inactivity. In one implementation, if the system again becomes busy with activity, the temporary archive capture task is suspended. There can be defined a time limit in which the temporary archive capture activity should resume. In an alternative implementation, temporary archives are generated substantially continuously with any detected change to the system (e.g., any file system change).

During the restoration process, the user might select a previous version of a data element, but then, upon restoration, decide that it would be preferable to revert to the version which had just been overwritten. By creating a temporary archive of the current state of the data element(s) that is about to be restored, in one implementation the backup restoration engine 222 has the ability to facilitate an "undo" operation.

A message block 414 alerts the user as to the date and time of the last backup event. The timestamp refers to the last scheduled backup event, not the most recent temporary backup that the backup component 117 saved. In one implementation, this information is obtained from the backup capture engine 220 (FIG. 2). The user can select a slide bar control 403 to switch the backup operations on or off. A user can select a backup now button 416 to trigger a backup event. In one implementation, the backup now button 416 calls the backup capture engine 220 (FIG. 2) to initiate a capture event using the settings provided within the time machine settings dialog 402.

If a checkbox 418 is selected, the time machine engine provides a status icon 420 within the menu bar 304 of the user interface 302. The status icon 420 could alter in appearance depending upon the time machine engine's status, e.g. when the time machine engine is disabled, when it is actively backing up files, or when it is in standby mode, etc. The status icon 420 can provide the user with an additional method of accessing the time machine settings dialog 402. In one implementation, a different type of status indicator could be used, or a different way of initiating it could be provided.

If a lock icon 419 is selected, the time machine engine backup configuration is essentially locked into place until the icon 419 is selected again. For example, selecting the lock icon 419 in the settings dialog 402 can ensure daily (automatic) backup operations are performed using a particular backup device (e.g., "Steve's backup device") as the storage medium until the lock icon 419 is selected, thus unlocking the current backup configuration.

A user can select a help button 422 to open a help dialog regarding the time machine engine. The help dialog could be presented within the time machine settings dialog 402 or in a separate pop-up window, for example. In another implementation, a mouse over of individual controls within the time machine settings dialog 402 could provide the user with a brief description of that control's functionality.

Figure 5:
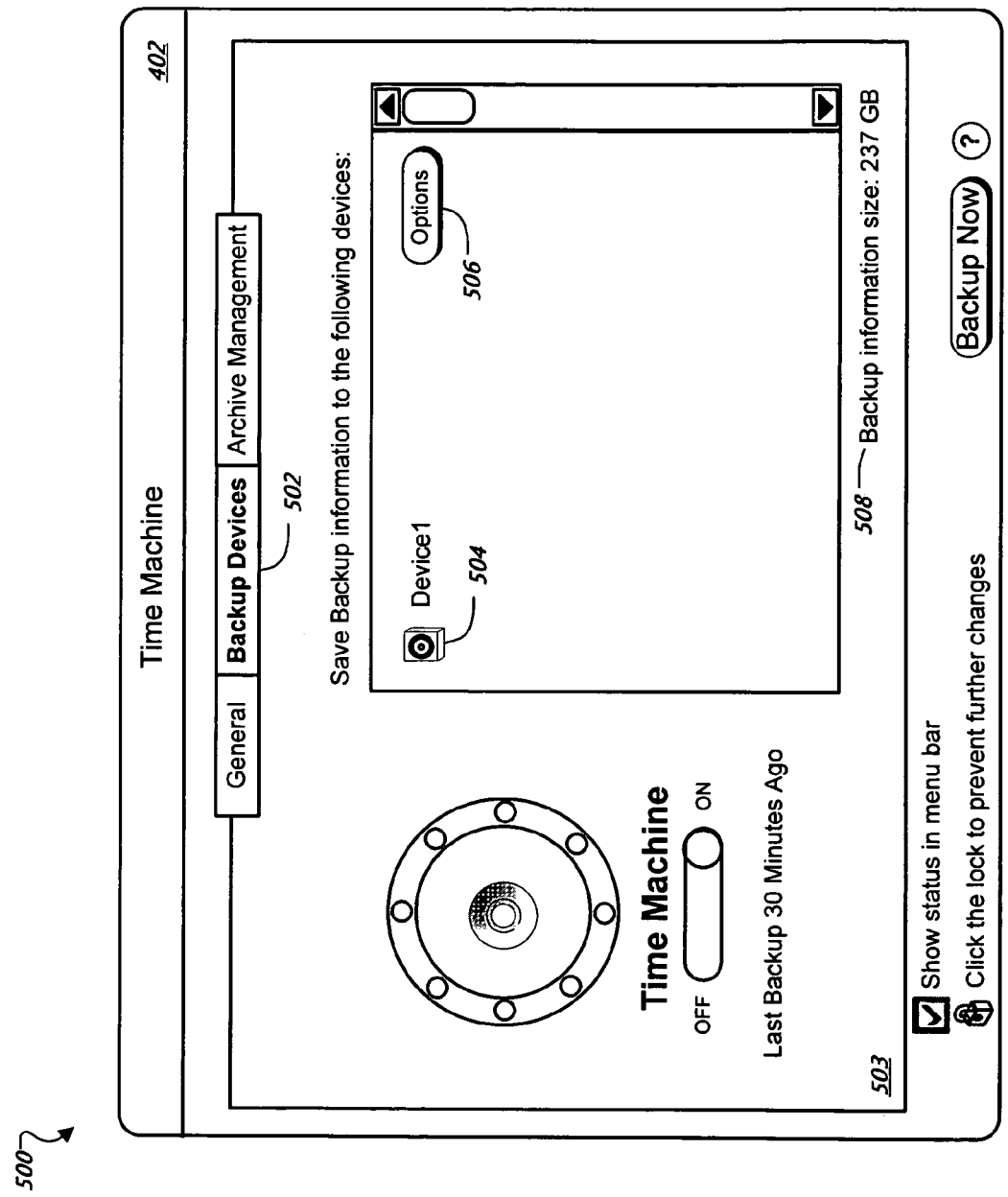
FIG. 5 shows an example of a time machine settings dialog for setting backup storage device options.

FIG. 5 shows a screen shot 500 depicting an example of the time machine settings dialog 402 in which a backup devices tab 502 is selected. A backup devices view 503 allows the user to select one or more repositories for storing archived items. In this example, a first device 504 is the only option presently available to the user. A user can select an options button 506 associated with the first device 504 to view a settings dialog for this device. In one implementation, selection of the options button 506 triggers the display of another pop-up window. An information field 508 informs the user of the present size of the archived information. In this example, the backup information is taking up 237 gigabytes of space.

Figure 6:
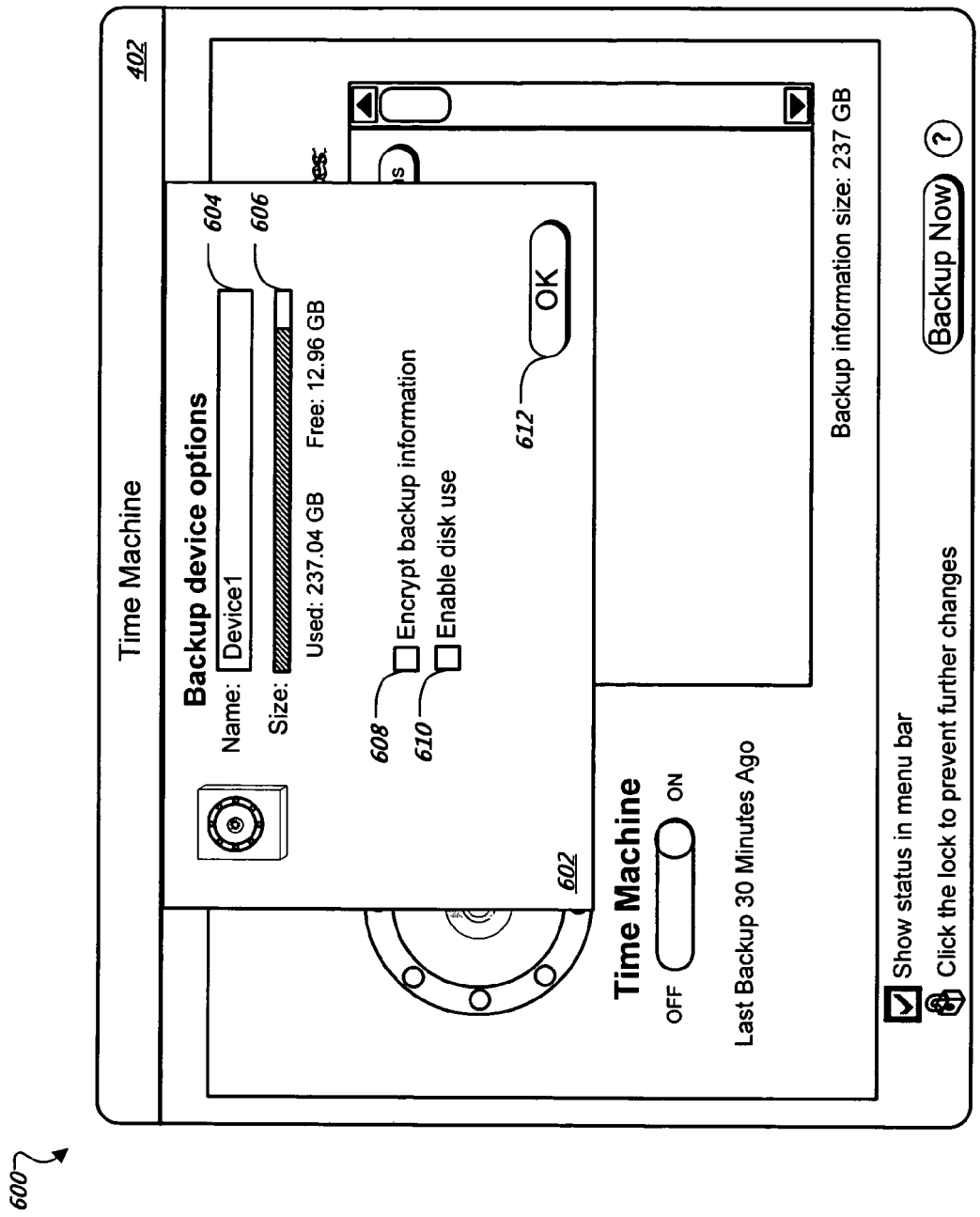
FIG. 6 shows an example of a time machine settings dialog with a pop-up window for a particular storage device.

For the next example, the user selects the options button 506 (FIG. 5). As shown in FIG. 6, a screen shot 600 contains a pop-up window 602 overlaying the time machine settings dialog 402. The pop-up window 602 displays options relating to the first device 504. An information field 604 contains the storage device name, in this example "Device1". A bar graph 606 illustrates the amount of free space available on the first device 504. According to the text beneath the bar graph, 237.04 gigabytes of memory has been used, and 12.96 gigabytes of memory is free on the first device 504.

A user can select a checkbox 608 to have the corresponding backup information encrypted. For example, in one implementation, this causes the existing archives within the associated backup device to be placed in an encrypted format. In another implementation, only the archives generated after the time of selecting the checkbox 608 will be generated in an encrypted format. In one implementation, the backup capture engine 220 (FIG. 2) creates the encrypted copies for the archives. A user can select a checkbox 610 to enable the backup component 117 to use the first device 504 as an archive storage location. In one implementation, the name field 604 could be user-selectable to define the storage location in greater detail. For example, a particular segment or segments of a backup device could be selected rather than the entire device. A user can select an OK button 612 to close the popup window 602 and return to the time machine settings dialog 402.

Figure 7:
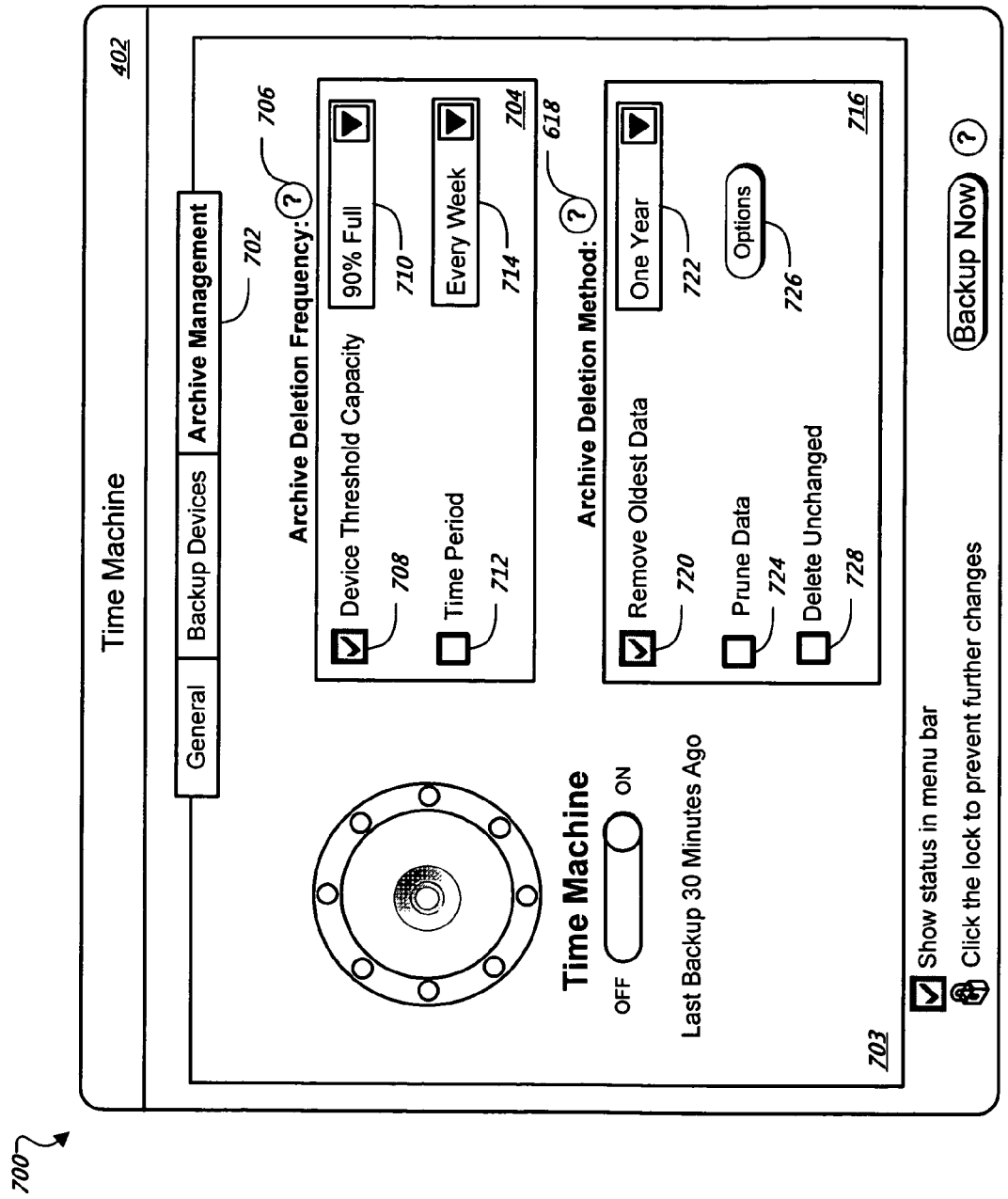
FIG. 7 shows an example of a time machine settings dialog for setting archive management options.

FIG. 7 shows a screen shot 700 depicting an example of the time machine settings dialog 402 in which an archive management tab 702 is selected. An archive management view 703 is presented within the time machine settings dialog 402. Archive management helps the user to control the information contained within the archives, thereby managing storage capacity requirements. A settings subsection 704 allows the user to control archive deletion frequency. The settings subsection 704 contains a first checkbox 708 with an associated drop-down menu 710. The first checkbox 708 relates to the device threshold capacity. Selection of the first checkbox 708 allows the user to choose a storage device capacity at which archive deletion should occur to clear space. For example, the user can specify that archive deletion should occur when the storage device is 90% full by setting the drop-down menu 710 to the 90% full label. In one implementation, this threshold setting pertains to the cumulative capacity of all storage devices activated as archive devices. In another implementation, archive management settings could be device-specific, user-specific, or application-specific. In one implementation, the user is notified when archive storage is nearing threshold capacity.

A second checkbox 712 provides that the user can choose to have archival information deleted on a periodic basis. An associated drop-down menu 714 can be used to set the specific time period. The second checkbox 712 allows the user to set a time period for archive data removal, e.g., the current setting of "Every week". Both the first checkbox 708 and the second checkbox 712 can be activated concurrently such that, for example, archival deletion occurs every other week and unscheduled cleanups are performed if the device reaches threshold capacity between the periodically scheduled removals. In one implementation, archive deletion could be triggered to occur at times of low system activity. In another implementation, the user can schedule the specific time(s) for archive creation in the archive management view 703.

In an alternative implementation, the time period selected indicates the age of the archival information prior to deletion. For example, the archival information can be deleted once it has been stored in the archive for a threshold period of time (e.g., an age of the archive information of a period of months or even years). Alternatively, a combination of age and remaining archive space can be used to determine deletion of archive information.

A help icon 706 provides the user with a description of the archive deletion frequency settings options. In one implementation, activation of the help icon 706 causes a pop-up window to appear. Alternatively, the help information could be provided within the confines of the settings subsection 704 or the archive management view 703, for example.

The user can access archive deletion method options through the settings subsection 716. A first checkbox 720 relates to removing the oldest data stored by the backup component 117. An associated drop-down menu 722 allows the user to specify the age at which archived data is eligible for deletion. For example, a user can specify that archived data is deleted when it is over one year old.

Sometimes, it may not be prudent to remove data based on age alone. This can for example be the case when the archived data is comprised of a collection of both relatively static data and very dynamic data. Relatively static data is one that is modified only infrequently; a relatively dynamic data is one that changes value often. If, in such a scenario, the archive deletion method is set for removal at one year old, archives containing copies of information which have not changed for over a year could be deleted from the system. Meanwhile, a large number of versions of a very dynamic piece of data could be using a large amount of archive storage space. A second checkbox 724 allows the user to instead direct the archive management engine 225 to prune data from the archive storage.

Pruning allows for selectively deleting one or more of the stored backup versions. In one implementation, as the archive views age, fewer views will be retained. For example, assume that incremental archives are created on a daily basis. Once a set of incremental archives thus created reaches a month old, selected ones of the incremental updates can be deleted, for example such that only weekly incremental updates remain. For archive contents that have aged between 1-3 months, only a semi-weekly version is retained from the weekly subset in this example. Contents 2-6 months old can be pruned to a monthly backup version. The user can also choose to remove all archived views that have aged beyond a certain point, for example, those that have been stored within the system for more than a year. A help icon 718 provides the user with a detailed description of the archive deletion method settings. In one implementation, different pruning rules can be used to define a particular pruning scheme similar to, or different from, the pruning scheme described above.

Figure 8:
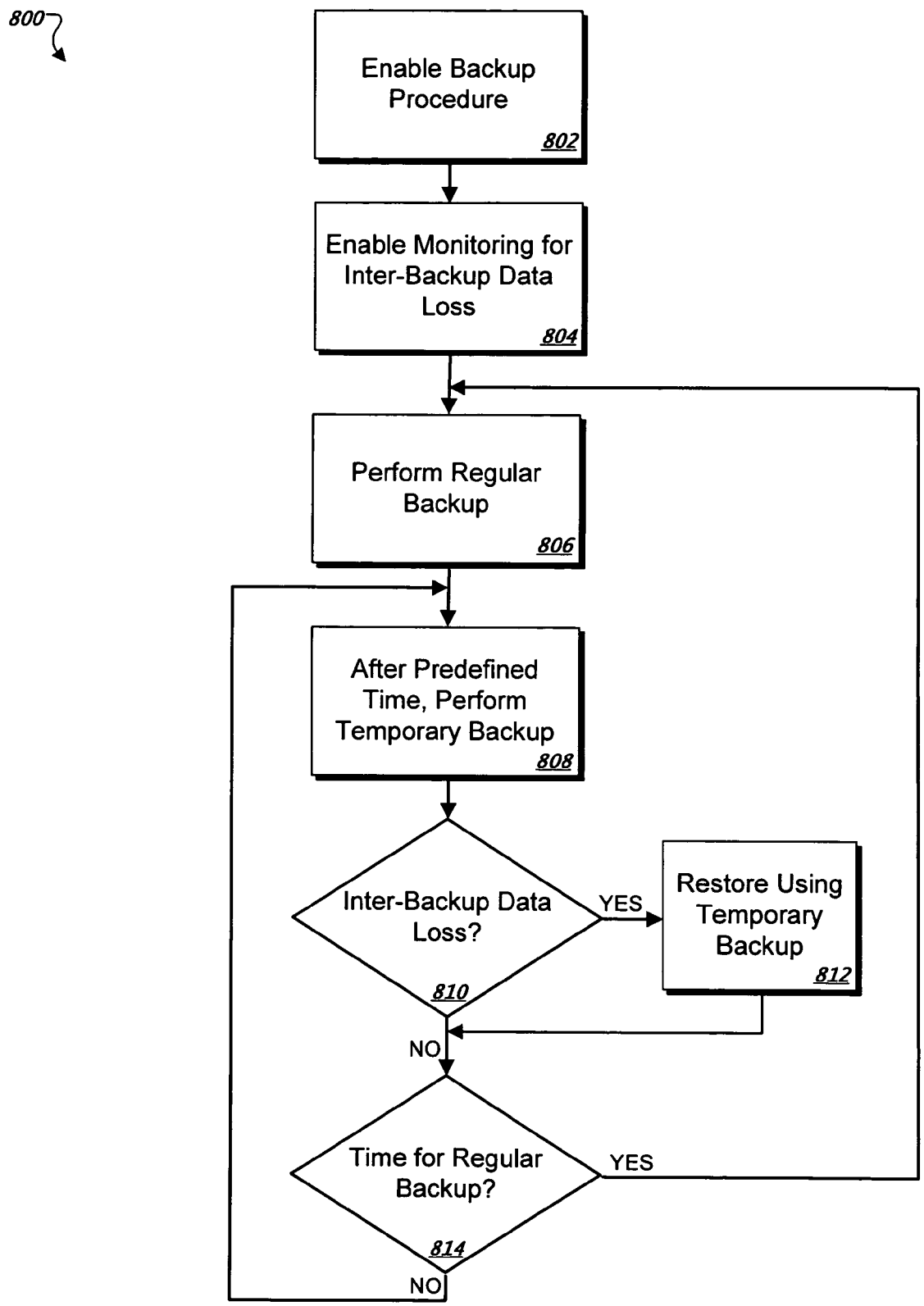
FIG. 8 shows a flow diagram of a method illustrating a backup process scenario.

FIG. 8 is a flow diagram of a method 800 illustrating a backup process scenario. The method 800 can be performed in a computer system with a storage device, to name one example. The method includes an enable backup procedure (step 802). The enable backup procedure can be available through a graphical user interface (GUI), for example, and can include a step of recording settings that are entered by the user. During the enable backup procedure, the user could designate a schedule for running the backup process, specify one or more storage devices to use for archival storage, or identify a set of items to be backed up, etc.

The method includes enabling monitoring for inter-backup data loss (step 804). The choice of monitoring for inter-backup data loss can be available through a GUI, for example, and can include a step of recording settings that are entered by the user. During the enable monitoring for inter-backup data loss procedure, the user can designate a schedule for running temporary backup operations such that changes made between scheduled backup events will not necessarily be lost in the event of a catastrophic data loss, for example due to a virus corrupting one or more data elements.

The method 800 involves performing a regular backup process (step 806). During the backup process, the backup engine can identify one or more storage devices for storing the backup archives and then store data from the device on the storage device(s). The stored data can have a format corresponding to a file system structure of the device. For example, this can provide that the stored data can be perused, for instance, using a standard file system navigation application.

After a predefined time, the backup engine can perform a temporary backup operation (step 808). The temporary backup operation can capture changes in the data since the time of the regular backup process. In one implementation, the backup application identifies data on the device that has changed since the regular backup operation. The backup engine could monitor for events indicating a change to data on the device. The backup engine could compare data on the device with the data of the regular backup to discover changes. There can be rules defining change events. For example, an updated timestamp might not be construed as a significant enough modification to define it as a change of the data for the purposes of triggering the archiving of a temporary backup copy.

A variety of events can trigger a temporary backup operation. For example, the backup engine can monitor system resources to identify a period of system inactivity during which it can initiate a temporary backup operation. Alternatively, the temporary backup operation could be performed according to a schedule (e.g. hourly, every other hour, etc.). A temporary backup operation could, in another circumstance, be performed in response to a change in data on the device. For example, a user could designate that a temporary backup operation be automatically triggered whenever the backup engine recognizes a change in a particular data set.

A temporary backup event can include storing the changed data outside the view of the user, e.g. in a manner different than the user-viewable regular backup hierarchy. In one implementation, only one temporary version of a particular data element is stored. For example, if a particular data element changes after a temporary backup archive for the element has been created, the backup engine could delete the older temporary archive during the next temporary backup event and only retain the most recent temporary archive. In one implementation, all temporary archives are deleted upon the performance of the next regular backup event. Any number of temporary backup events can occur between regular backup events.

The method includes monitoring for inter-backup data loss (step 810). For example, a user could recognize that a catastrophic event has occurred that causes corruption or permanent deletion of data elements. The user could then initiate a restoration event, for example through a GUI interface, which includes the request to restore a temporary archive if it contains the most recent changes held by the backup component (e.g., backup component 117). In another implementation, the computer system could recognize that a data loss event has occurred and initiate a restoration process. If the system has suffered inter-backup data loss, the method involves restoring the data element(s) using the temporary backup (step 812). In one implementation, the user could be prompted, through a GUI for example, for authorization before the restoration of any data takes place. Once the data has been restored, the method 800 continues on its present cycle of performing regular and temporary backup operations.

The method 800 includes determining whether it is time for a regular backup operation (step 814). In one implementation, the regular backup operations can be performed on a set schedule, for example a schedule established by the user. If it is not time for a regular backup event to occur, the system can continue its schedule of temporary backup events. If it is time for a regular backup event, the method 800 performs the regular backup event. The method 800 could end upon occurrence of an event, such as a predefined ending time, a user input, or system shutdown.

Figure 9:
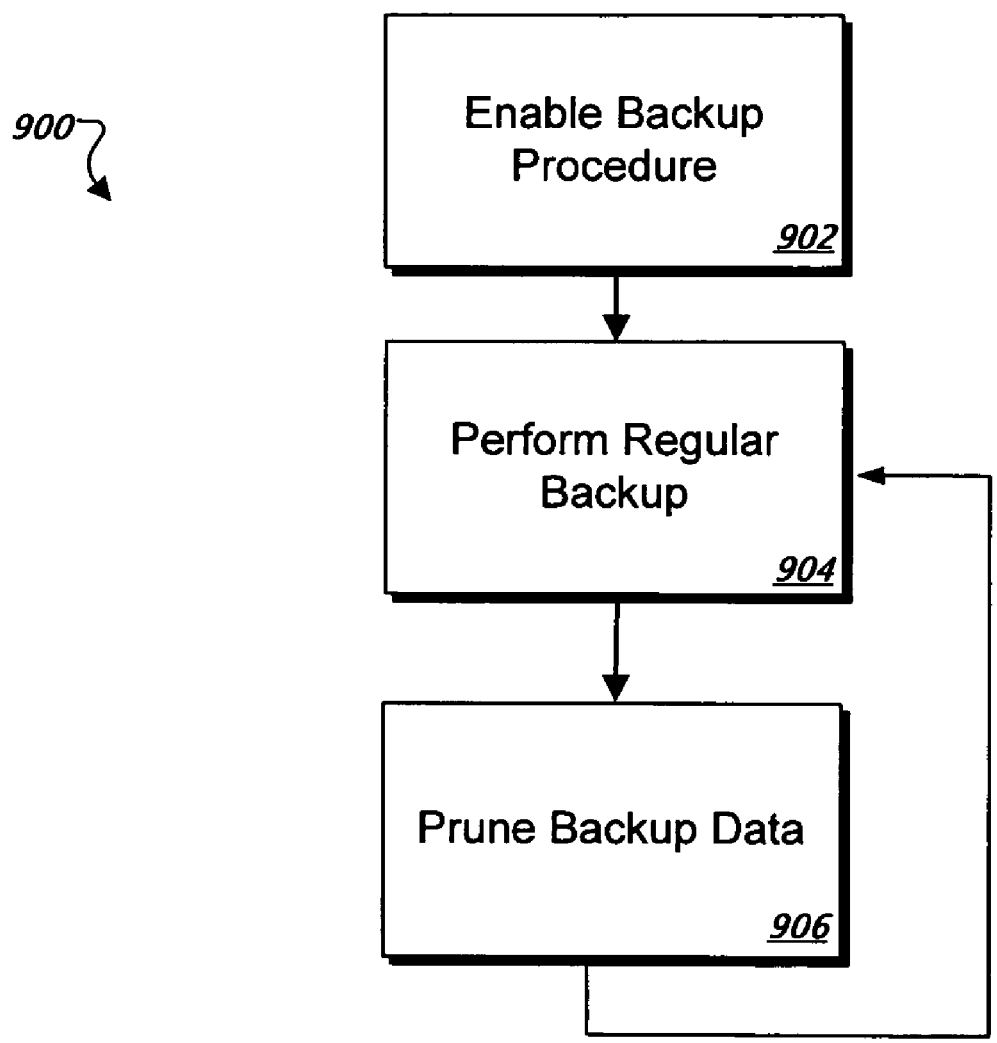
FIG. 9 shows a flow diagram of a method illustrating another backup process scenario.

FIG. 9 is a flow diagram of a method 900 illustrating a backup process scenario. The method 900 can be performed in a computer system with a storage device, to name one example. The method includes an enable backup procedure (step 902). The enable backup procedure can be available through a graphical user interface (GUI), for example, and could include the step of recording settings that are entered by the user. During the enable backup procedure, the user could designate a schedule for running the backup process, specify one or more storage devices to use for archival storage, or identify a set of items to be backed up, etc.

The method 900 involves performing a regular backup process (step 904). During the backup process, the backup engine can identify one or more storage devices for storing the backup archives and then store data from the device on the storage device(s). The stored data could have a format corresponding to a file system structure of the device. For example, the proposed formatting allows the stored data to be perused, for instance, using a standard file system navigation application.

The method 900 includes pruning some or all of the backup data (step 906). Pruning can be done according to any or all of the pruning examples described herein. For example, pruning can be selectively performed on backup versions based on their age. The method 900 could repeat one or more of the steps 904 and 906 as indicated.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments can be used, and that the examples can be implemented using graphics tools and products other than those described above. In particular, the client/server approach is merely one example of an architecture for providing the functionality described herein; one skilled in the art will recognize that other, non-client/server approaches can also be used. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it could comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

The subject matter described in this specification can be implemented as one or more computer program products, i.e., one or more modules of computer program instructions encoded on a computer readable medium for execution by, or to control the operation of, data processing apparatus. The instructions can be organized into modules (or engines) in different numbers and combinations from the exemplary modules described. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method relating to modifying a view in a user interface, the method comprising:
    receiving, while a current view of the user interface is displayed, a first user input requesting that a prior state of the user interface be displayed;
    displaying the prior state of the user interface in response to the first user input, the prior state of the user interface including at least a first representation of the user interface, where the first representation shows a past state of the current view of the user interface and includes one or more visual representations of one or more elements from the past state, where the underlying data for the first representation is stored in a backup archive, and where the first representation includes a first element;
    receiving, while the first representation is displayed, a second user input requesting that the current view of the user interface be modified according to the past state, at least with regard to the first element; and
    modifying, in response to the second user input, the current view of the user interface according to the past state, at least with regard to the first element.

2. The method of claim 1, wherein the second user input does not request that the modification be limited to the first element, and wherein the modification restores the current view of the user interface to the past state.

3. The method of claim 1, wherein the second user input requests that the modification be limited to the first element, and wherein the modification modifies the current view of the user interface to include the first element and does not otherwise modify the current view of the user interface.

4. The method of claim 1, wherein the first element is one selected from the group consisting of: a folder, a file, an item, an information portion, a playlist, a directory, an image, system parameters, and combinations thereof.

5. The method of claim 1, wherein the first representation is included in a timeline, the timeline including several representations of past states of the current view.

6. The method of claim 5, wherein the past states of the current view were obtained at times defined by a schedule.

7. The method of claim 5, wherein the past states of the current view were obtained at times defined by a rule.

8. The method of claim 5, wherein the past states of the current view were obtained at times when at least one predefined event occurred.

9. The method of claim 5, wherein the prior state of the user interface further includes an input control for modifying the timeline to include only at least one of the several representations whose corresponding past state differs from the current view.

10. The method of claim 5, wherein the prior state of the user interface includes a rollover function providing that the timeline is displayed when a user-controlled cursor is located over the timeline, and that the timeline is not displayed when the user-controlled cursor is not located over the timeline.

11. The method of claim 1, wherein the prior state of the user interface further includes a preview area that presents at least the first element of the past state.

12. A computer program product tangibly embodied in a computer readable storage medium, the computer program product having stored thereon instructions which, when executed by a processor, causes the processor to perform operations comprising:
    receiving, while a current view of a user interface is displayed, a first user input requesting that a prior state of the user interface be displayed;
    displaying the prior state of the user interface in response to the first user input, the prior state of the user interface including at least a first representation of the user interface, where the first representation shows a past state of the current view of the user interface and includes one or more visual representations of one or more elements from the past state, where the underlying data for the first representation is stored in a backup archive, and where the first representation includes a first element;
    receiving, while the first representation is displayed, a second user input requesting that the current view of the user interface be modified according to the past state, at least with regard to the first element; and
    modifying, in response to the second user input, the current view of the user interface according to the past state, at least with regard to the first element.

13. A method comprising:
    defining a criterion for capturing a state of a view of a user interface;
    capturing the state of the view in accordance with the criterion and storing the captured state in a backup archive;
    receiving a prompt to suspend a current presentation of the user interface and to present a captured view of the user interface, the captured view including a first representation of the user interface, where the first representation shows a past state of the user interface; and
    reinstating the captured view including presenting the captured view as the current state of the user interface.

14. A computer program product tangibly embodied in a computer readable storage medium, the computer program product having stored thereon instructions which, when executed by a processor, causes the processor to perform operations comprising:

defining a criterion for capturing a state of a view of a user interface;

capturing the state of the view in accordance with the criterion and storing the captured state in a backup archive;

receiving a prompt to suspend a current presentation of the user interface and to present a captured view of the user interface, the captured view including a first representation of the user interface, where the first representation shows a past state of the user interface; and reinstating the captured view including presenting the captured view as the current state of the user interface.

15. A method comprising:

evaluating a current view of a user interface;

determining that an undesirable change to the current view of the user interface has occurred relative to a past view of the user interface;

suspending a current presentation of the user interface;

presenting one or more representations of past views of the user interface in a preview distinct from the current presentation of the user interface, where the underlying data for each representation is stored in a backup archive; and reinstating a past view of the user interface including presenting the past view as the current state of the user interface.

16. A computer program product tangibly embodied in a computer readable storage medium, the computer program product having stored thereon instructions which, when executed by a processor, causes the processor to perform operations comprising:

evaluating a current view of a user interface;

determining that an undesirable change to the current view of the user interface has occurred relative to a past view of the user interface;

suspending a current presentation of the user interface;

presenting one or more representations of past views of the user interface in a preview distinct from the current presentation of the user interface, where the underlying data for each representation is stored in a backup archive; and reinstating a past view of the user interface including presenting the past view as the current state of the user interface.

17. A method comprising:

defining criteria for capturing a state of a view of a user interface;

capturing one or more temporary states of the view prior to the criteria being satisfied and storing the captured one or more temporary states in a backup archive; and capturing the state of the view in accordance with the criteria.

18. The method of claim 17, further comprising:

receiving a prompt to suspend a current presentation of the user interface and to present a captured view of the user interface, the captured view including a first representation of the user interface, where the first representation shows a past state of the user interface; and reinstating the captured view including presenting the captured view as the current state of the user interface.

19. The method of claim 17, further comprising:

discarding the temporary states of the view after capturing the state of the view.

20. The method of claim 17, where the criteria is a time period and where capturing a temporary state of the view occurs when a change in the state of the view is identified.

21. A method comprising:

storing underlying data for a plurality of prior states of a current view of a user interface in a backup archive, where each prior state includes a representation of the user interface, the representation showing a past state of the user interface;

determining criteria for deleting the underlying data for one or more of the plurality of prior states; and deleting the underlying data for one or more of the plurality of prior states in accordance with the criteria.

22. The method of claim 21, where the criteria include a time period for retaining stored underlying data in the backup archive and a prior state of the current view is deleted when the age of the view exceeds the time period.

23. The method of claim 21, where the criteria include an amount of storage space remaining in the backup archive and the underlying data for a prior state of the current view is deleted when the amount of storage space falls below a threshold level.

24. The method of claim 21, where the criteria include one or more pruning rules and the underlying data for one or more prior states of the current view are deleted according to the pruning rules.

* * * * *

UNITED STATES PATENT AND TRADEMARK OFFICE
CERTIFICATE OF CORRECTION

PATENT NO.         : 7,809,688 B2
APPLICATION NO.    : 11/499839
DATED              : October 5, 2010
INVENTOR(S)        : Pavel Cisler et al.

Page 1 of 1

It is certified that error appears in the above-identified patent and that said Letters Patent is hereby corrected as shown below:

On Title page 3, item (56); in column 1, "Other Publications," line 4, delete "leotimemacindex" and insert -- leotimemac/index --, therefor.

In column 3, line 24, delete "sate" and insert -- state --, therefor.

Signed and Sealed this
Fifteenth Day of November, 2011

David J. Kappos
*Director of the United States Patent and Trademark Office*